(12) United States Patent
CaveLie et al.

(10) Patent No.: US 8,812,031 B2
(45) Date of Patent: *Aug. 19, 2014

(54) MAP TILE DATA PRE-FETCHING BASED ON MOBILE DEVICE GENERATED EVENT ANALYSIS

(75) Inventors: Hans-Olav CaveLie, San Francisco, CA (US); Thomas Gregory Nourse, Half Moon Bay, CA (US)

(73) Assignee: Google Inc., Mountain View, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 13/599,458

(22) Filed: Aug. 30, 2012

(65) Prior Publication Data

US 2013/0080594 A1 Mar. 28, 2013

Related U.S. Application Data

(63) Continuation of application No. 13/244,686, filed on Sep. 26, 2011, now Pat. No. 8,280,414.

(51) Int. Cl.
*G06F 15/16* (2006.01)
(52) U.S. Cl.
USPC ........................................ 455/457; 455/456.1
(58) Field of Classification Search
USPC ................ 455/456.1, 457; 370/252, 315, 338
See application file for complete search history.

(56) References Cited

U.S. PATENT DOCUMENTS

| | | | |
|---|---|---|---|
| 4,984,279 A | 1/1991 | Kidney et al. | |
| 5,345,086 A | 9/1994 | Bertram | |
| 5,793,310 A | 8/1998 | Watanabe et al. | |
| 6,094,685 A | 7/2000 | Greenberg et al. | |
| 6,199,150 B1 | 3/2001 | Yoshikawa | |
| 6,330,453 B1 | 12/2001 | Suzuki et al. | |
| 6,400,690 B1 | 6/2002 | Liu et al. | |
| 6,442,757 B1 | 8/2002 | Hancock et al. | |
| 6,453,233 B1 | 9/2002 | Kato | |
| 6,571,279 B1 | 5/2003 | Herz et al. | |
| 6,853,911 B1 | 2/2005 | Sakarya | |

(Continued)

FOREIGN PATENT DOCUMENTS

| | | |
|---|---|---|
| KR | 10-2008-071228 | 8/2008 |
| WO | WO-98/28714 A1 | 7/1998 |
| WO | WO-2009/027161 A1 | 3/2009 |

OTHER PUBLICATIONS

Google Developers, "Google Maps API," (2012). Retrieved from the Internet on Aug. 31, 2012: URL:https://developers.google.com/maps/.

(Continued)

*Primary Examiner* — Sam Bhattacharya
(74) *Attorney, Agent, or Firm* — Marshall, Gerstein & Borun LLP

(57) ABSTRACT

Map tile data for displaying graphic elements of a web-based mapping system in a mobile computing device may be pre-fetched to the device based on an analysis of the historical uses of a mapping module at that mobile device. The mobile device may retrieve user mapping activity data and extract geographic location data from the mapping activity data. This geographic location data may then be used to retrieve map tile data that is related to another request for map tile data. This related map tile data may then be stored in cache storage to be retrieved during periods of reduced communication with a map tile server or other periods.

17 Claims, 4 Drawing Sheets

(56) References Cited

U.S. PATENT DOCUMENTS

| | | | |
|---|---|---|---|
| 7,006,820 B1 | 2/2006 | Parker et al. | |
| 7,136,748 B2 | 11/2006 | Umezu et al. | |
| 7,263,368 B2 | 8/2007 | Knauerhase et al. | |
| 7,315,259 B2 | 1/2008 | Sacks | |
| 7,327,349 B2 | 2/2008 | Robbins et al. | |
| 7,464,109 B2 | 12/2008 | Modi | |
| 7,502,780 B2 | 3/2009 | Thorpe | |
| 7,502,876 B1 | 3/2009 | Nemirovsky et al. | |
| 7,551,182 B2 | 6/2009 | Bethune et al. | |
| 7,571,422 B2 | 8/2009 | Adel et al. | |
| 7,577,520 B2 | 8/2009 | Nomura | |
| 7,584,434 B2 | 9/2009 | Okamura | |
| 7,610,147 B2 | 10/2009 | Umezu et al. | |
| 7,663,671 B2 | 2/2010 | Gallagher et al. | |
| 7,710,421 B2 | 5/2010 | Muramatsu | |
| 7,711,473 B2 | 5/2010 | Sekine et al. | |
| 7,734,412 B2 | 6/2010 | Shi et al. | |
| 7,739,037 B2 | 6/2010 | Sumizawa et al. | |
| 7,796,837 B2 | 9/2010 | Lueck | |
| 7,831,383 B2 | 11/2010 | Oohashi | |
| 7,831,387 B2 | 11/2010 | Golding et al. | |
| 7,839,421 B2 | 11/2010 | Bethune et al. | |
| 7,873,465 B2 | 1/2011 | Geelen et al. | |
| 7,920,968 B2 | 4/2011 | Chapin et al. | |
| 7,925,624 B2 | 4/2011 | Vosshall et al. | |
| 7,925,982 B2 | 4/2011 | Parker et al. | |
| 7,962,565 B2 | 6/2011 | Coker | |
| 7,974,959 B2 | 7/2011 | Sawai et al. | |
| 7,975,025 B1 | 7/2011 | Szabo et al. | |
| 7,983,659 B2 | 7/2011 | Shinya | |
| 7,996,445 B2 | 8/2011 | Fair et al. | |
| 8,005,612 B2 | 8/2011 | Asahara et al. | |
| 8,010,407 B1 | 8/2011 | Santoro et al. | |
| 8,014,796 B2 | 9/2011 | Boudreau et al. | |
| 8,032,297 B2 | 10/2011 | Jakobson | |
| 8,060,389 B2 | 11/2011 | Johnson | |
| 8,078,641 B2 | 12/2011 | Mao et al. | |
| 8,095,307 B2 | 1/2012 | Ebert et al. | |
| 8,204,966 B1 | 6/2012 | Mendis et al. | |
| 8,280,414 B1 * | 10/2012 | Nourse et al. | 455/457 |
| 2002/0133491 A1 | 9/2002 | Sim et al. | |
| 2003/0187984 A1 | 10/2003 | Banavar et al. | |
| 2004/0203998 A1 | 10/2004 | Knauerhase et al. | |
| 2004/0220730 A1 | 11/2004 | Chen et al. | |
| 2006/0026170 A1 | 2/2006 | Kreitler et al. | |
| 2006/0067224 A1 | 3/2006 | Ohara | |
| 2006/0069749 A1 | 3/2006 | Herz et al. | |
| 2006/0080032 A1 | 4/2006 | Cooper et al. | |
| 2006/0195256 A1 | 8/2006 | Nakamura et al. | |
| 2006/0277271 A1 | 12/2006 | Morse et al. | |
| 2007/0050128 A1 | 3/2007 | Lee et al. | |
| 2007/0080830 A1 | 4/2007 | Sacks | |
| 2007/0143014 A1 | 6/2007 | Sekine et al. | |
| 2007/0242077 A1 | 10/2007 | Danan | |
| 2007/0273558 A1 | 11/2007 | Smith et al. | |
| 2007/0282915 A1 | 12/2007 | Vosshall et al. | |
| 2008/0071988 A1 | 3/2008 | Schloter et al. | |
| 2008/0082225 A1 | 4/2008 | Barrett | |
| 2008/0102857 A1 | 5/2008 | Kim | |
| 2008/0132249 A1 | 6/2008 | Hamilton | |
| 2008/0177469 A1 | 7/2008 | Geelen et al. | |
| 2008/0238723 A1 | 10/2008 | Fein et al. | |
| 2008/0270579 A1 | 10/2008 | Herz et al. | |
| 2008/0291205 A1 | 11/2008 | Rasmussen et al. | |
| 2009/0063042 A1 | 3/2009 | Santesson et al. | |
| 2009/0125228 A1 | 5/2009 | Dicke et al. | |
| 2009/0128483 A1 | 5/2009 | Robbins et al. | |
| 2009/0132163 A1 | 5/2009 | Ashley, Jr. et al. | |
| 2009/0153563 A1 | 6/2009 | Tudose | |
| 2009/0182500 A1 | 7/2009 | Dicke | |
| 2009/0198767 A1 | 8/2009 | Jakobson et al. | |
| 2009/0244095 A1 | 10/2009 | Bowman et al. | |
| 2009/0281718 A1 | 11/2009 | Gibran et al. | |
| 2009/0287750 A1 | 11/2009 | Banavar et al. | |
| 2009/0319177 A1 | 12/2009 | Khosravy et al. | |
| 2009/0319188 A1 | 12/2009 | Otto | |
| 2009/0326810 A1 | 12/2009 | Callaghan et al. | |
| 2010/0020091 A1 | 1/2010 | Rasmussen et al. | |
| 2010/0106397 A1 | 4/2010 | Van Essen | |
| 2010/0106801 A1 | 4/2010 | Bliss et al. | |
| 2010/0117810 A1 | 5/2010 | Hagiwara et al. | |
| 2010/0131186 A1 | 5/2010 | Geelen et al. | |
| 2010/0153007 A1 | 6/2010 | Crowley | |
| 2010/0179940 A1 | 7/2010 | Gilder et al. | |
| 2010/0250646 A1 | 9/2010 | Dunagan et al. | |
| 2010/0274899 A1 | 10/2010 | Shrivastava et al. | |
| 2010/0321399 A1 | 12/2010 | Ellren et al. | |
| 2010/0333085 A1 | 12/2010 | Criddle et al. | |
| 2011/0054776 A1 | 3/2011 | Petrov et al. | |
| 2011/0093515 A1 | 4/2011 | Albanese | |
| 2011/0095993 A1 | 4/2011 | Zuverink | |
| 2011/0098917 A1 | 4/2011 | LeBeau et al. | |
| 2011/0098918 A1 | 4/2011 | Siliski et al. | |
| 2011/0161875 A1 | 6/2011 | Kankainen | |
| 2011/0213798 A1 | 9/2011 | Osuka et al. | |
| 2011/0276263 A1 | 11/2011 | Shimotani et al. | |
| 2011/0300848 A1 | 12/2011 | Boudreau et al. | |
| 2011/0316854 A1 | 12/2011 | Vandrovec | |
| 2012/0022786 A1 | 1/2012 | Siliski et al. | |
| 2012/0022787 A1 | 1/2012 | LeBeau et al. | |
| 2012/0083995 A1 | 4/2012 | Vorona | |

OTHER PUBLICATIONS

International Search Report and Written Opinion for Application No. PCT/US2012/051574, dated Feb. 15, 2013.

International Search Report and Written Opinion for Application No. PCT/US2012/051577, dated Feb. 15, 2013.

International Search Report and Written Opinion for Application No. PCT/US2012/065002, dated Mar. 29, 2013.

International Search Report and Written Opinion for Application No. PCT/US2012/065008, dated Mar. 29, 2013.

International Search Report for Application No. PCT/US2012/051564, dated Feb. 18, 2013.

Mapquest, "JavaScript Maps API," (2012). Retrieved from the Internet on Aug. 31, 2012: URL:http://developer.mapquest.com/web/products/featured/javascript.

MSDN, "Get Started Using Bing Maps," (2012). Retrieved from the Internet on Aug. 31, 2012: URL:http://msdn.microsoft.com/en-us/library/dd877180.aspx.

Wiki, "API," (2012). Retrieved from the Internet on Aug. 31, 2012: URL:http://wiki.openstreetmap.org/wiki/API.

Reichenbacher et al., "The World in Your Pocket—Towards a Mobile Cartography," Proc. of the 20th International Cartographic Conference (2001).

Piras et al., "Compact GML: merging mobile computing and mobile cartography," CRS4, Center for Advanced Studies, Research and Development in Sardinia (2004).

Molina, "Aiming and Guiding Navigation with a Non-visual GPS Application," Department of Design Sciences Faculty of Engineering, Lund University (2010).

Kirchner et al. "A Location-aware Prefetchting Mechanism," Project work at Distributed Information Systems Laboratory LSIR (2004).

Weber, "Mobile Map Browsers: Anticipated User Interaction for Data Pre-Fetching," Thesis, The University of Maine, (2010).

Office action for U.S. Appl. No. 13/244,764 dated Nov. 28, 2011.

Office action for U.S. Appl. No. 13/244,717 dated Nov. 15, 2011.

International Preliminary Report on Patentability for Application No. PCT/US2012/051564, dated Apr. 1, 2014.

International Preliminary Report on Patentability for Application No. PCT/US2012/065008, dated Jun. 10, 2014.

International Preliminary Report on Patentability for Application No. PCT/US2012/065002, dated May 20, 2014.

International Preliminary Report on Patentability for Application No. PCT/US2012/051574, dated Jun. 17, 2014.

International Preliminary Report on Patentability for Application No. PCT/US2012/051577, dated Jun. 17, 2014.

* cited by examiner

MAP TILE DATA PRE-FETCHING BASED ON MOBILE DEVICE GENERATED EVENT ANALYSIS

CROSS-REFERENCE TO RELATED APPLICATION

This application is a continuation of U.S. application Ser. No. 13/244,686, filed Sep. 26, 2011, the disclosure of which is hereby incorporated herein by reference in its entirety for all purposes.

FIELD OF TECHNOLOGY

The present disclosure relates generally to pre-fetching digital map data and more specifically to a system and a method for pre-fetching digital map data for viewing on a mobile device based on an analysis of data generated by a mapping application executing at that mobile device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many mobile computing devices such as cellular phones, tablet computers, notebooks, etc., incorporate global positioning system (GPS) hardware and applications. GPS hardware and applications are useful for navigation with mobile computing devices and are often paired with mobile mapping modules. When instantiated on the device, mobile mapping modules may communicate with a GPS transmitter or other GPS hardware on the device and a backend application server of a mapping system. Using mapping data pushed or pulled from the backend mapping system, the mapping module may then render a digital map of an area around the device's current position on the mobile device. Map data is often pushed to the device from the mapping system based on the device position provided to the system from the GPS hardware via the mapping module. For example, data for graphical representations of streets, buildings, and other geographical features may be pushed to the mobile device and the mapping module running on the device may render the pushed data into images on a display screen of the device based on the current position of the device or based on a search of the mapping system using the device.

To render a map image, a device typically receives raster images from a dedicated server. For example, a map server may operate on the Internet and provide images in a Portable Network Graphics (PNG) format to various client devices for the specified geographic regions. While raster images are relatively easy to render at a client device, raster image data typically requires a large amount of storage space for a comprehensive map. Also, it is difficult to efficiently manipulate raster images at a client device. For example, to zoom in on a selected region, either new raster image data is retrieved from the server, or the available raster image data is enlarged with a noticeable loss in quality.

SUMMARY

The features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

Map tile data (i.e. portions of a map image that have a uniform size such as 256 pixels by 256 pixels) for displaying graphic elements of a web-based mapping system in a smart phone or other mobile computing device may be pre-fetched to the device based on an analysis of the historical uses of a mapping module at that mobile device. For example, a user mapping activity system may receive user mapping activity data from the mobile device via a network connection. A mapping module executing on the mobile computing device may generate the user mapping activity data. The user mapping activity system may then extract geographic location data from the user mapping activity data and send the geographic location data to a mapping system via a network connection. The mapping system may then match a geographic location associated with map tile data to the geographic location the user mapping activity data and send the matched tile data to the mobile computing device for cache storage at the mobile computing device. The user mapping activity system may also analyze the user mapping activity data to determine whether the extracted geographic location data is relevant enough to warrant pre-fetching the tile data. Relevant geographic location data may include a number of geographic location indications above a threshold.

In some embodiments, the user mapping activity data includes one or more of a location history file corresponding to a log of geographic locations where the mobile device executed the mapping module, a search history file corresponding to a log of searches conducted using the mapping module, and a routing history file corresponding to a log of routes between geographic locations represented by the mapping module. The geographic location data may include data generated or received by a mapping application executing on the mobile computing device that indicates a user's current location, a user's desired future location, etc. For example, the geographic location data may include one or more of a city name, an address, an airport code, or global positioning system coordinates.

Figure 1:
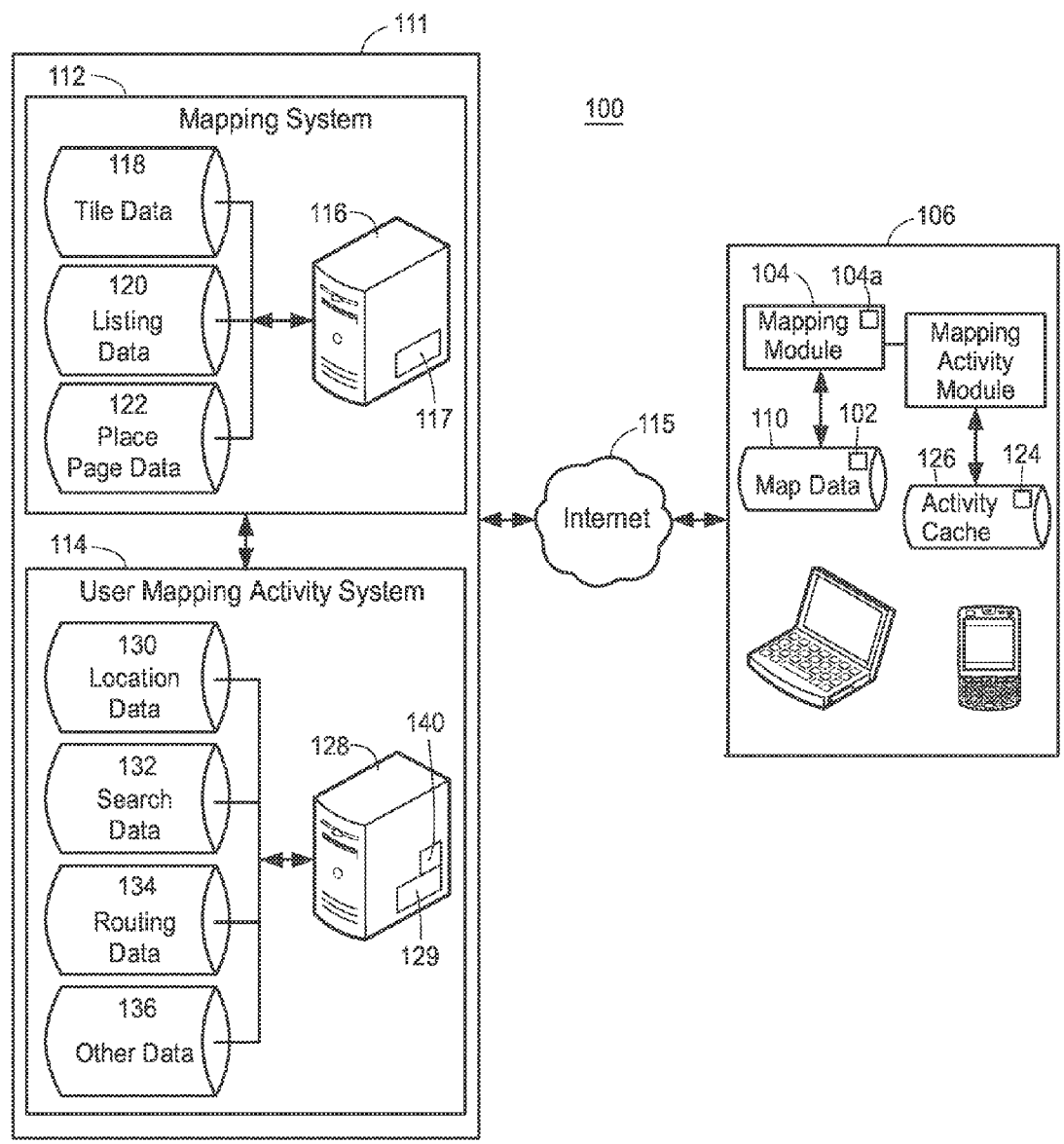
FIG. 1 is a high-level block diagram of a system for pre-fetching data for a mapping module executing on a mobile computing device based on an analysis of the historical uses of the mapping module using the mobile device.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Generally speaking, a mapping module executing on a mobile device pre-fetches digital map tile data for the mapping module. The size of a geographic region represented by an individual map tile may depend on the zoom level at which a user views a map and with which the map tile is associated, so that a single map tile at a lower zoom level illustrates a larger geographic area than a single map tile at a higher zoom level. A mapping system may generate each map tile with descriptors according to a vector graphics format. A client device (e.g., a mobile phone, tablet computer, etc.) may locally generate a raster image for each tile from the vector descriptor corresponding to each map tile. In an embodiment, a mapping system 100 (FIG. 1) retrieves the requested data from a database. Once fetched from a remote mapping system, the map tile data may then be stored in the mobile device for possible display to a user based on an analysis of user action taken with the mapping module. The user's mapping module activity analysis may identify one or more predetermined geographical locations for which the user is likely to view map data in the future. Once the map tile data is pre-fetched and stored in the memory of the mobile device, the mobile device may quickly render a digital map using the pre-fetched map tile data for the one or more predetermined geographical locations without having to obtain map data from a backend mapping system. Pre-fetching the map tile data may reduce map rendering latency and lead to a better user experience. The user mapping module activity analysis determines the one or more geographical locations for which to pre-fetch map data by determining geographical locations at which the user is likely to be present in the future. This analysis may be performed at the backend of the mobile device and may consider all data related to the user's mapping module activity. In some embodiments, the system may use data related to where the user spends most of his or her time, searches the user has performed via the mapping module, routes or trips planned, events detected at the mobile device, etc.

In general, vector-based map data may specify various geometric shapes (e.g., using mathematical descriptions of points and paths connecting the points) and indicate how these shapes should be positioned for rendering various map elements such as roads, buildings, parks, bodies of water, etc. For example, rather than specifying each pixel that makes up a raster image of a line segment, a vector-based description of the line segment may specify the two endpoints of the line segment and indicate that the two endpoints are connected by a straight line. Vector-based descriptions of map elements may be referred to herein as vector descriptors or simply vectors, and a set of one or several vector descriptors may be referred to as vector data. In general, a map element may be described using a certain vector descriptor. A backend or remote mapping system may generate a vector-based description of a geographic region in view of a zoom level at which a map of the geographic region is to be rendered at the client device, a map type (e.g., terrain, traffic, transit, etc.) according to which the map is rendered at the client device, previously provided map data, etc. Also, in some embodiments, the map server may provide vector data that describes map content separately from style data that indicates how the vector data should be rendered and label and place page data that describes the map content by text, images, etc.

FIG. 1 is a high-level block diagram that illustrates a system 100 for pre-fetching map tile data 102 for a mapping module 104 executing on a computing device 106 based on an analysis of user mapping module activity. The system 100 may include a computing device 106 that is capable of executing the mapping module 104, a user mapping activity module 108 and other modules that allow the device 106 to pre-fetch data to allow the mapping module 104 to fetch or receive and store map tile data within a map data cache 110 (i.e., memory of the computing device 106 or other memory, etc.). In some embodiments, the device 106 executes instructions of the mapping module 104 and the user mapping activity module 108. The device 106 may include a personal computer, smart phone, tablet computer, or other computing device capable of executing the various modules, instructions, etc., described herein. The mapping module 104 and user mapping activity module 108 may communicate with backend components 111 including a mapping system 112 and a user mapping activity system 114 through the Internet 115 or other type of network (e.g., LAN, a MAN, a WAN, a mobile or cellular network, a wired or wireless network, a private network, or a virtual private network, etc.).

A mapping system server 116 may send and receive data for the mapping module 104. In some embodiments, the mapping system 112 and mapping server 116 may send computer-executable instructions and data to allow the mapping module 104 to render a digital map in a display component of the computing device 106. For example, the mapping server 116 may include a module 117 to receive location data, results of an analysis by the client computing device 106 or the user mapping activity system 114, or other data and, in return, send digital map tile data 118 in a vector graphics format, listing data 120 corresponding to particular businesses or addresses represented within the digital map tile data 118, place page data 122 corresponding to web sites of the particular businesses or addresses of the listing data 120, etc.

In some embodiments, the mapping module 104 and user mapping activity module 108 may analyze data to determine which map tiles the mapping system 112 will send to the device 106 for caching and retrieves those tiles from the system 112. In other embodiments, the backend components 111 may analyze data sent from the computing device 106 to determine which tiles to send to the device 106 for cache storage. For example, the mapping module 104 may send location data from a GPS transceiver of the computing device 106 to the mapping system 112 and the user mapping activity module 108 may send user mapping activity data from the computing device 106 to the user mapping activity system 114. User mapping activity data may generally include any data generated or received by a mapping application executing on the mobile computing device that indicates a geographic location (e.g., a user's current or future location, a planned location, location preferences, etc.). For example, in some embodiments, the user mapping activity data includes one or more of a log of map search requests, routing data between various points on a map, points of interest on a map, favorite location preferences set by the user or determined by the mapping application, etc. The geographic location data may include one or more of a city name, an address, an airport code, global positioning system coordinates, etc.

The mapping module 104 may include computer-executable instructions to allow the mapping module 104 to render a digital representation of a user's current geographic location or any other geographic location in a display component of the computing device 106. As part of the rendering process (e.g., when the user executes the mapping module 104, conducts a geographic location search using the mapping module 104, conducts a route search between two or more geographic locations using the mapping module 104, etc.), the mapping module 104 may execute instructions to display a mapping interface 104a including rasterized vector data from the mapping system 112 (i.e., tile data 118, listing data 120, place page data 122) and/or cached map tile data 102 within a display of the computing device 106. The mapping interface 104a may allow a user to cause the device 106 to render various digital representations of geographic locations using map data 102 from the cache 110, from the mapping system 112, or other map data sources.

The user mapping activity module 108 may include computer-executable instructions to gather user mapping activity data 124 from a user mapping activity data cache 126, the mapping module 104, or various other modules of the computing device 106. In some embodiments, the user mapping activity data cache 126 may store data 124 from a variety of other modules executing on the computing device 106 or in communication with the computing device 106 (e.g., a web browser, a user mapping activity tracking module, a trip planning module, an email module, etc.). The user mapping activity module 108 may also include instructions to analyze the user mapping activity data 124 or to send the data 124 to the user mapping activity system 114 for analysis.

In some embodiments, the user mapping activity module 108 at the client device 106 may receive, send, and analyze mobile device event data 124 for pre-fetching map tile data 102 that is displayed at the computing device 106 using the mapping module 104. In some embodiments, the module 108 includes instructions to analyze user mapping activity data 124 including a history of locations determined by GPS hardware of the computing device, mapping module search history data, routing data from routes planned between two or more geographic locations represented by the mapping module 104, or other data 136 indicating geographic locations the user has specified using the mapping module 104. Analysis of the mobile device event data 124 by the module 108 at the client mobile computing device 106 may determine location data that the module 108 may send to the mapping system 112 to retrieve map tile data 200 for cache storage at the mobile device.

In other embodiments, the user mapping activity system 114 may include a user mapping activity system server 128 at the backend 111 that includes a module 129 to receive, send, and analyze user mapping activity data 124 for pre-fetching map tile data 102 that is displayed at the computing device 106 using the mapping module 104. In some embodiments, the server 128 stores the user mapping activity data 124 in one or more data repositories. For example, the data 124 may include the user's location 130 including a history of locations determined by GPS hardware of the computing device, mapping module search history data 132, routing data from routes planned between two or more geographic locations represented by the mapping module 104, or other data 136 indicating geographical locations the user is planning to visit or is likely to visit as determined from data generated by the mapping module 104. Module 129 may include computer-executable instructions to analyze the data stored in the data repositories 130, 132, 134, and 136. Analysis of the user mapping activity data 124 by the module 129 at the server backend components 111 may determine location data that the user mapping activity system server 128 may send to the mapping system 112.

Figure 2:
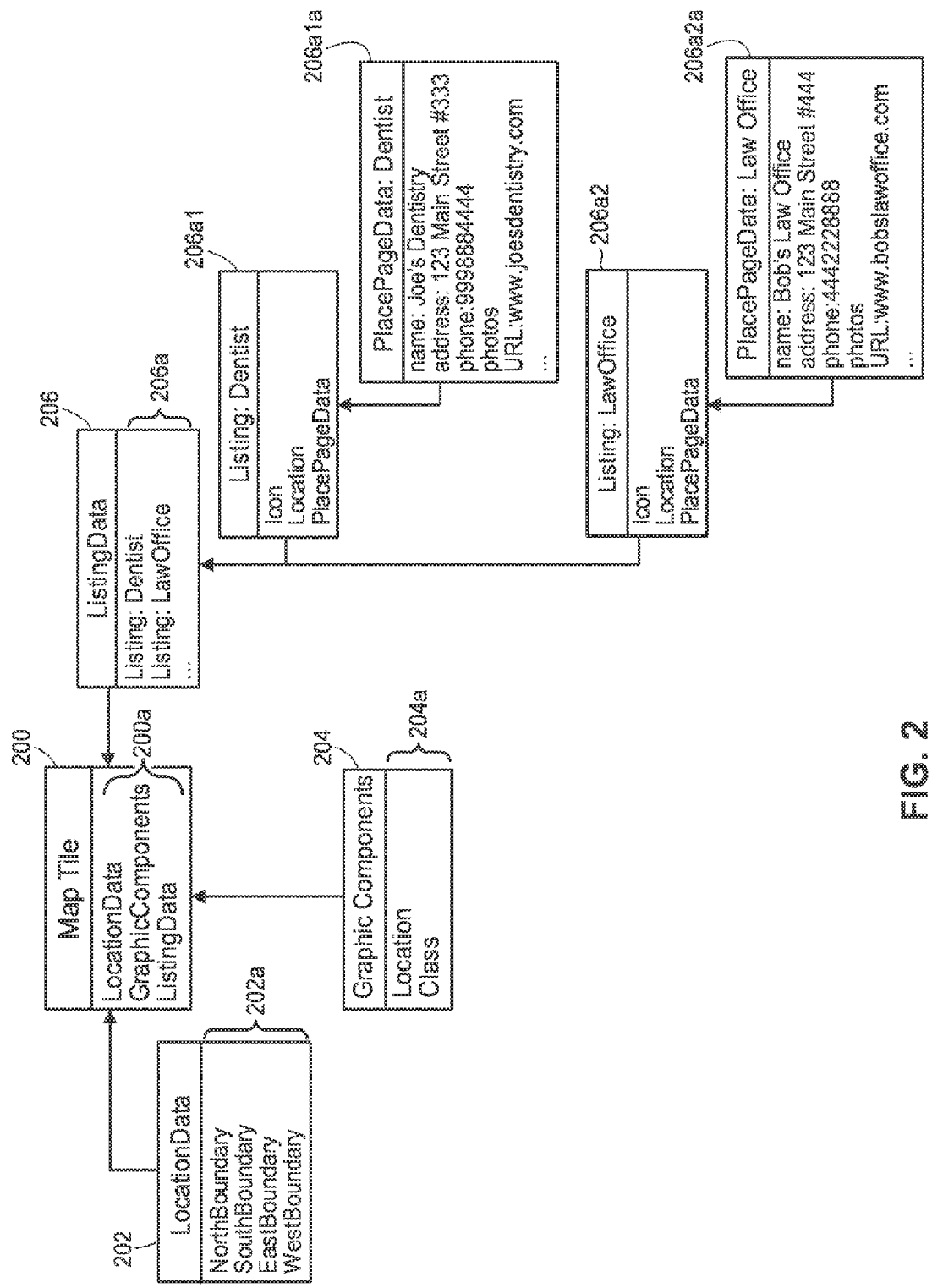
FIG. 2 is an exemplary data structure for a map tile that is pre-fetched according to user mapping module data.

FIG. 2 illustrates one embodiment of a high-level block diagram for map tile data 200. A map tile 200 may include a plurality of attributes 200a, for example, a name, location data 202, graphic components 204, and listing data 206. The location data 202 may include particular coordinates 202a that describe the specific geographic location of the map tile 200 that represents a geographic area. In some embodiments, the location data 202 includes a plurality of boundaries 202a such as a north, south, east, and west boundary for the map tile 200. The location data 202 may include latitude and longitude coordinates as determined by a global positioning system (GPS) or other system that is able to determine where the physical object is located. The graphic components 204 may include location and classification data 204a. In some embodiments, the location data for a graphic component 204 may include a GPS coordinate, a position within the boundaries 202a of the map tile 200, etc. The classification data for a graphic component 204 may include a type of physical object the graphic component 204 represents such as a structure, transportation item (e.g., road, rail, etc.), terrain features, and other items that graphically represent the physical objects contained within the boundaries described by the location data 202 of the map tile 200. The listing data 206 may include various groups of information 206a that describe characteristics of the physical objects represented by the graphic components 204 within the map tile 200. In some embodiments, the information 206a includes listing information for businesses, points of interest, shopping centers, parks, etc., that are graphically represented within the map tile 200. The information 206a may also include specifications and other information describing the history of the object, physical specifications, etc. For example, the information 206a may include several listings 206a1, 206a2, etc., that include an icon, location, and PlacePageData 206a1a for businesses, points of interest, etc., represented by the listing data 206 within the map tile 200. PlacePageData 206a1a may include text, photos, and other data to render a web page including information from various web resources that describes a particular listing represented by a graphic component 204, icon, or other graphic item within the map tile 200.

Figure 3:
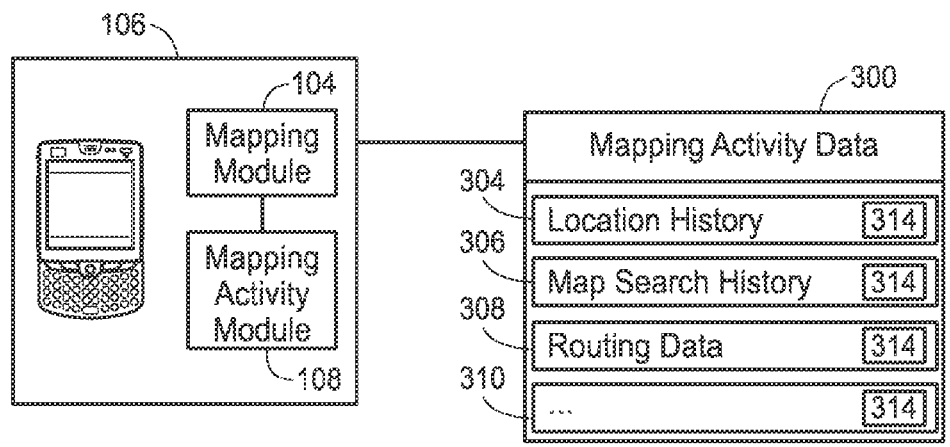
FIG. 3 is an exemplary block diagram of a mobile computing device and a data structure for user mapping module data.

FIG. 3 is a representation of user mapping activity data 300 that may be used by the system 100 to pre-fetch map tile data 200 for storage within a map data cache 110 and display on a computing device 106. The mapping activity data 300 may be collected by a computing device 106 executing a user mapping activity module 108. The module 108 may be in communication with the mapping module 104 executing on the computing device 106. In some embodiments, the mapping module 104 may respond to user input to produce mapping activity data 300 related to the mapping module 104. For example, the mapping activity module 108 may include computer-executable instructions to cause the computing device 106 to retrieve location history data 304, map search history data 306, routing data between two or more points on a map rendered by the computing device 106, etc., from the mapping module 104. Of course, the user mapping activity module 108 may monitor any application executing on the computing device 106 for location-related data that could be used to pre-fetch map tile data 200 for storage within a map data cache 110 and display on a computing device 106. Each of the various sets of user mapping activity data 304, 306, 308, 310, may include data 314 that indicates a geographic location (i.e., geographic location data 314).

Figure 4:
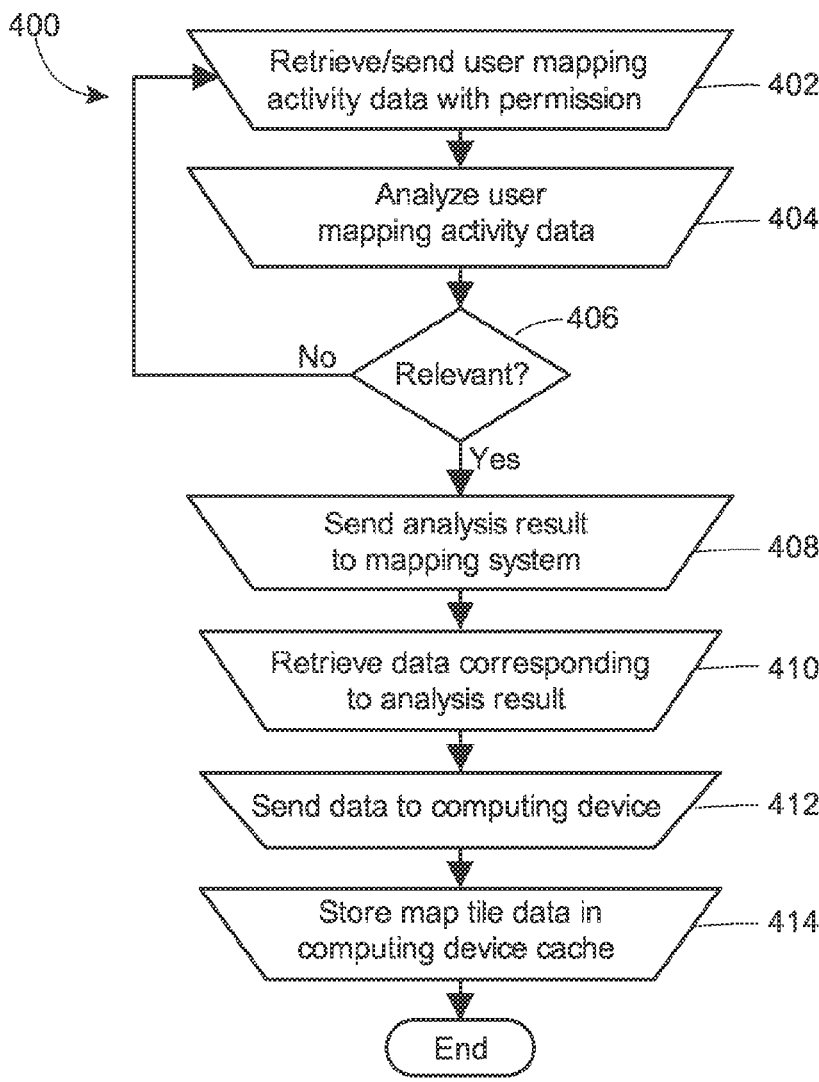
FIG. 4 is an exemplary flow chart of one method for pre-fetching map tile data for a web and cellular network-based mapping system as described herein.

FIG. 4 is a flow diagram of an example method 400 for pre-fetching map tile data 200 for storage within a map data cache 110 and display on a computing device 106. The method 400 may include one or more blocks, modules, functions or routines in the form of computer-executable instructions that are stored in a tangible computer-readable medium and executed using a processor of a computing device (e.g., a smart phone, tablet computer, or a mobile computing device, or other personal computing device, as described herein). The method 400 may be included as part of any backend 111 or client mobile computing device 106 modules of a computing environment for a system 100 for pre-fetching map tile data 200, for example, or as part of a module that is external to such a system. For example, the method 400 may be part of a mapping module 104 and/or a user mapping activity module 108 executing within an application on a computing device of a system 100 for pre-fetching map tile data 200. FIG. 4 will be described with reference to the Figures for ease of explanation, but the method 400 can of course be utilized with other objects and user interfaces.

At block 402, the method 400 may, after receiving user permission from an opt-out user interface, retrieve user mapping activity data 300 from a mapping module 104 executing on a computing device 106. Block 402 may include instructions to present a web page or other interface on a user's computing device from which a user may choose to opt-out of any data collection that allows or enables the computing device 106 or any other part of the system 100 to pre-fetch map tile data. The mapping activity data 300 retrieved from the mapping module 104 may include a history file corresponding to a log of locations 304 saved by the mapping module 104, searches 306 performed by the mapping module 104 for geographic locations within maps rendered on the computing device 106 by the mapping module 104, routing information 308 for directions between geographic locations represented on the rendered maps, etc. In some embodiments, the user mapping activity data 300 may be retrieved from the mobile computing device 106 in response to a request from the user mapping activity module 108, backend components 111 (e.g., the user mapping activity system 114), or other modules and components that are local to or remote from the mobile computing device 106. In further embodiments, the mobile computing device 106 may periodically send the user mapping activity data 300 or results of the analysis described below to backend components 111. Furthermore, the user mapping activity system may retrieve/receive the user mapping activity data 300 from other sources such as another computing device linked to the mapping system 112 via a web services account that is common to a user of both the mobile computing device 106 and the other device.

At block 404, the method 400 may analyze the user mapping activity data 300 sent or retrieved at block 402. In some embodiments, the user mapping activity module 108 at the client mobile computing device 106 may periodically analyze the user mapping activity data 300 and send results to a local or remote user mapping activity system 114 or the mapping system 112 via a network connection. In other embodiments, the user mapping activity system 114 may retrieve or receive the data 300 from the mobile computing device 106 via a network connection. The event module 108 may receive or retrieve the data 300 and parse it to discover geographic location data 314. The module 108 may include one or more computer-executable instructions to parse the data 300 to identify or determine geographic location data 314 from the user mapping activity data 300. Alternatively or additionally, backend components 111 analyze the data 300 and a user mapping activity system server 128 may receive or retrieve the data 300 and parse it to discover location data 314. The module 108 and/or the module 129 may include one or more computer-executable instructions to parse the data 300 and to identify or determine location data 314 from the data 300. The geographic location data 314 determined from the user mapping activity data 300 may include a city name, an address, an airport code, GPS coordinates or any other information indicating a geographic location that is usable by the mapping system 112 to determine map tile data.

If, at block 406, the geographic location data 314 is relevant enough to warrant pre-fetching map tile data, then the module 129 or module 108 may send the data to a mapping system 112 at block 408. In some embodiments, the module 129 or 108 may include one or more computer-executable instructions to analyze the user mapping activity data 300 to determine if any discovered geographic location data 314 is relevant enough to continue pre-fetching map tile data for storage in a cache 110. For example, the module 129 or 108 may only determine one instance of geographic location data 314 from the user mapping activity data 300 that indicates "Boston" as a geographic location. Only one indication may not warrant any further action by the system 100 to cache map tile data. However, more indications of particular geographic location data 314 from more user mapping activity data 300 may, collectively, reach a threshold amount to warrant executing further instructions to cache map tile data. The module 129 or 108 may include computer-executable instructions to store the geographic location data 314 within one or more data repositories. For example, the module 129 or 108 may analyze a mapping module search history 306, determine geographic location data 314 within the history 306, and store that determined data within a repository 132. If the determined geographic location data 314 within the data repository 132 meets or exceeds a threshold amount, then the amount of geographic location data 314 may warrant executing further instructions to cache map tile data.

The user mapping activity data 300 or the determined geographic location data 314 may also include timestamp information and the module may include computer-executable instructions to determine a threshold time period for which the determination of geographic location data 314 would warrant caching map tile data. For example, if the module 129 or 108 determined three geographic location data 314 indications for "Boston" within a time period of a week, the module(s) may determine that one or more thresholds have been exceeded and execute further instructions to cache map tile data for that location. In contrast, if the module 129 or 108 determined three geographic location data 314 indications for "Boston" within a time period of a year, the module(s) may determine that one or more thresholds have not been exceeded and return to block 402. Of course, block 404 and 406 may perform statistical and other analyses of the user mapping activity data 300 to determine whether to proceed to the next block or continue retrieving user mapping activity data 300.

If, after the analysis of block 404 and 406, the method 400 determines that the geographic location data 314 is relevant enough to warrant executing further computer-executable instructions to cache map tile data, the method 400 may send the analysis result 140 of blocks 404 and 406 to the mapping system 112 at block 408. The user mapping activity system 114 or the client mobile computing device 106 may send the analysis result 140 to the mapping system server 116 for processing by the module 117.

At block 410, the module 117 may execute instructions to match the received analysis result 140 that includes relevant geographic location data to mapping system data. In some embodiments, block 410 matches the received geographic location data to one or more of map tile data 118, listing data 120, place page data 122, etc., that corresponds to an analysis result 140 sent to or retrieved by the mapping system 112. In some embodiments, the module retrieves data from one or more data repositories of the mapping system 112.

At block 412, the module 117 may execute instructions to send the retrieved data to a mobile computing device 106. In some embodiments, block 412 sends one or more of tile data, listing data 120, place page data 122, etc., to a computing device 106. The method 400 may also send the retrieved data to a mapping module 104 executing on the computing device 106 that sent the user mapping activity data 300 to the user mapping activity system 114.

At block 414, the computing device 106 or mapping module 104 that received the tile data, listing data 120, place page data 122, etc., may execute instructions to store the received data. In some embodiments, the block 414 may store the received data in a cache 110. The mapping module 104 may then use the cached data to render a map for display on the computing device from the cache 110.

Figure 5:
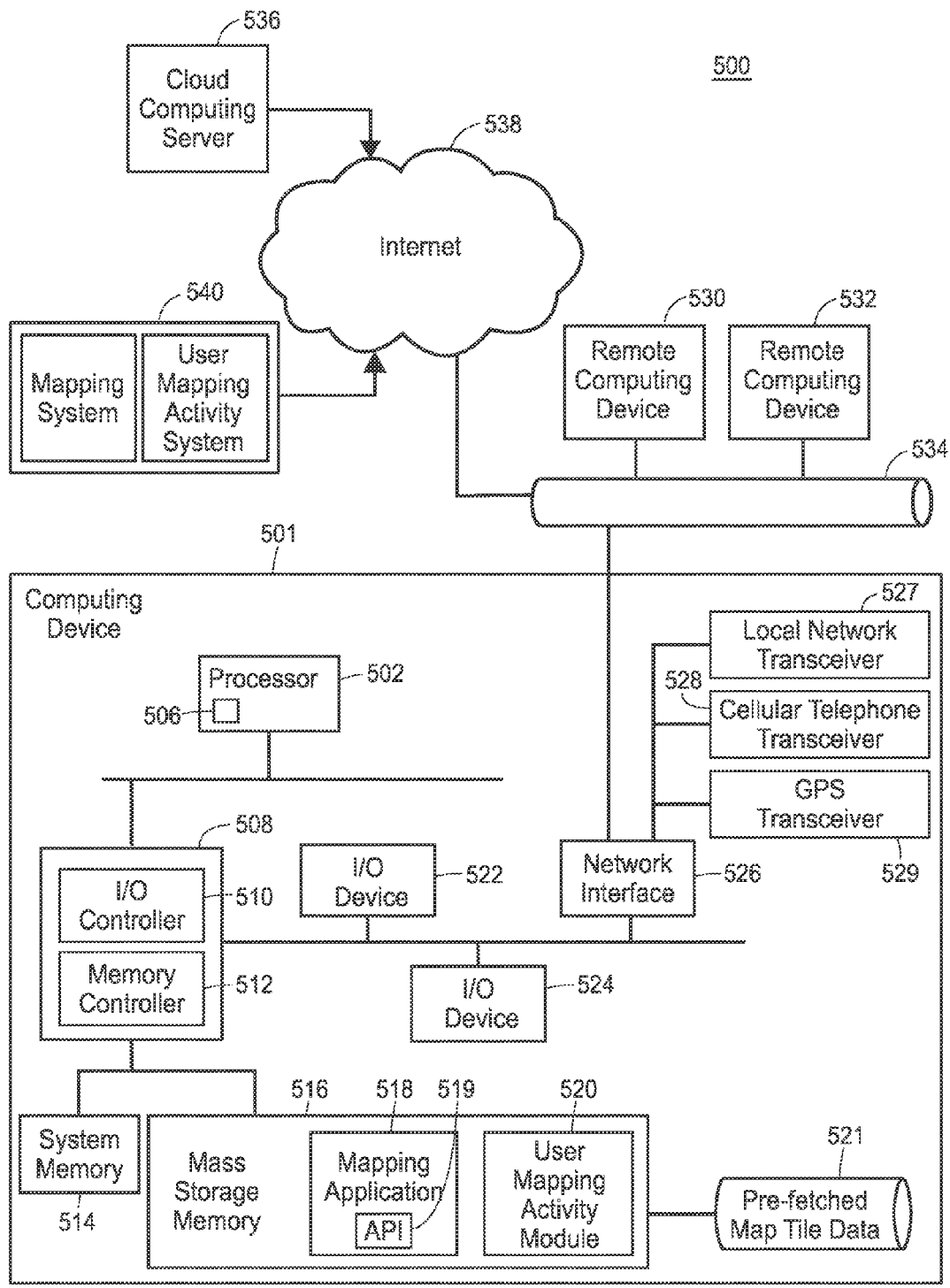
FIG. 5 is high-level block diagram of a computing environment that implements a system and method for pre-fetching data for cache storage and display on a computing device executing a mapping module.

FIG. 5 is a high-level block diagram of an example computing environment for a mobile mapping system 500 having a computing device 501 that may be used to implement the method 500 for pre-fetching map tile data 200 for storage within a map data cache 110 and display on a computing device 106. The computing device 501 may include a mobile device (e.g., a cellular phone, a tablet computers, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example mobile mapping system 500 may be used to implement and execute the example system of FIG. 1, the data structures of FIGS. 2 and 3, the method of FIG. 4, etc. Although the example mobile mapping system 500 is described below as including a plurality of peripherals, interfaces, chips, memories, etc., one or more of those elements may be omitted from other example processor systems used to implement and execute the example system 100 to pre-fetch map tile data. Also, other components may be added.

As shown in FIG. 5, the computing device 501 includes a processor 502 that is coupled to an interconnection bus 504. The processor 502 includes a register set or register space 506, which is depicted in FIG. 5 as being entirely on-chip, but which could alternatively be located entirely or partially off-chip and directly coupled to the processor 502 via dedicated electrical connections and/or via the interconnection bus 504. The processor 502 may be any suitable processor, processing unit or microprocessor. Although not shown in FIG. 5, the computing device 501 may be a multi-processor device and, thus, may include one or more additional processors that are identical or similar to the processor 502 and that are communicatively coupled to the interconnection bus 504.

The processor 502 of FIG. 5 is coupled to a chipset 508, which includes a memory controller 510 and a peripheral input/output (I/O) controller 512. As is well known, a chipset typically provides I/O and memory management functions as well as a plurality of general purpose and/or special purpose registers, timers, etc. that are accessible or used by one or more processors coupled to the chipset 508. The memory controller 510 performs functions that enable the processor 502 (or processors if there are multiple processors) to access a system memory 514 and a mass storage memory 516.

The system memory 514 may include any desired type of volatile and/or non-volatile memory such as, for example, static random access memory (SRAM), dynamic random access memory (DRAM), flash memory, read-only memory (ROM), etc. The mass storage memory 516 may include any desired type of mass storage device. For example, if the computing device 501 is used to implement a mapping module 518 having an API 519 and a user mapping activity module 520 (including instructions as described by the method 400 of FIG. 4), the mass storage memory 516 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 501 and the mobile mapping system 500. Thus, a module, block, function, operation, procedure, routine, step, and method can be implemented in hardware, firmware, and/or software. In one embodiment, program modules and routines (e.g., the mapping module 518, the API 519, the user mapping activity module 520, etc.) are stored in mass storage memory 516, loaded into system memory 514, and executed by a processor 502 or can be provided from computer program products that are stored in tangible computer-readable storage mediums (e.g. RAM, hard disk, optical/magnetic media, etc.). Mass storage 516 may also include a database 521 storing GPS data, graphics, map tile data, and other data for use by the mapping module 518 and user mapping activity module 520 as well as a database interface module through which the mapping module 518, the API 519, the user mapping activity module 520, etc., may access the GPS data, graphics, etc. received from a mapping data server 116, user mapping activity system 114, or other system.

The peripheral I/O controller 510 performs functions that enable the processor 502 to communicate with peripheral input/output (I/O) devices 522 and 524, a network interface 526, a cellular network transceiver 527, a local network transceiver 528, and a GPS transceiver 529 (via the network interface 526) via a peripheral I/O bus 528. The I/O devices 522 and 524 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O devices 522 and 524 may be used with the mapping module 518 and user mapping activity module 520 to receive GPS data from the GPS transceiver 529, send the GPS data to the backend components of the system 100, render, and display maps and user interfaces as described in relation to the figures. A cellular telephone transceiver 527 may be resident with the local network transceiver 528. The local network transceiver 528 may include support for a Wi-Fi network, Bluetooth, Infrared, or other wireless data transmission protocols. In other embodiments, one element may simultaneously support each of the various wireless protocols employed by the computing device 501. For example, a software-defined radio may be able to support multiple protocols via downloadable instructions. In operation, the computing device 501 may be able to periodically poll for visible wireless network transmitters (both cellular and local network) on a periodic basis. Such polling may be possible even while normal wireless traffic is being supported on the computing device 501. The network interface 528 may be, for example, an Ethernet device, an asynchronous transfer mode (ATM) device, an 802.11 wireless interface device, a DSL modem, a cable modem, a cellular modem, etc., that enables the system 100 for pre-fetching map tile data to communicate with another computer system having at least the elements described in relation to the system 100.

While the memory controller 512 and the I/O controller 510 are depicted in FIG. 5 as separate functional blocks within the chipset 508, the functions performed by these blocks may be integrated within a single integrated circuit or may be implemented using two or more separate integrated circuits. The mobile mapping system 500 may also implement the mapping module 518 and user mapping activity module 520 on remote computing devices 530 and 532. The remote computing devices 530 and 532 may communicate with the computing device 501 over an Ethernet link 534. For example, the computing device 501 may receive mapping data created by a mapping module executing on a remote computing device 530, 532. In some embodiments, the mapping module 518 and/or the user mapping activity module 520 may be retrieved by the computing device 501 from a cloud computing server 536 via the Internet 538. When using the cloud computing server 536, the retrieved mapping module 518 and/or the user mapping activity module 520 may be programmatically linked with the computing device 501. The mapping module 518 and/or the user mapping activity module 520 may be a Java® applet executing within a Java® Virtual Machine (JVM) environment resident in the computing device 501 or the remote computing devices 530, 532. The mapping module 518 and/or the user mapping activity module 520 may also be "plug-ins" adapted to execute in a web-browser located on the computing devices 501, 530, and 532. In some embodiments, the mapping module 518 and/or the user mapping activity module 520 may communicate with back end components 540 such as the mapping system 112 and user mapping activity system 114 may via the Internet 538.

Using the systems and procedures described above, the system for pre-fetching map data 100 and mapping system 500 can retrieve and analyze data from a computing device that indicates a geographic location corresponding to user mapping activity with a mapping module executing on a computing device 106. User mapping activity, location data, a mapping module search history, routing data, or other data may be parsed to determine likely locations for pre-fetching map tile data. Of course, the systems described herein may present a user with a user interface from which the user is able to opt-out of any of the pre-fetching methods described herein to preserve user privacy.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the system 500 may include but is not limited to any combination of a LAN, a MAN, a WAN, a mobile, a wired or wireless network, a private network, or a virtual private network. Moreover, while only three remote computing devices 530 and 532 are illustrated in FIG. 5 to simplify and clarify the description, it is understood that any number of client computers are supported and can be in communication within the system 500.

Additionally, certain embodiments are described herein as including logic or a number of components, modules, or mechanisms. Modules may constitute either software modules (e.g., code embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map editor system for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for pre-fetching digital map data for viewing on a mobile device based on an analysis of data generated by a mapping application executing at that mobile device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for pre-fetching map tile data to a mobile computing device based on activity with a mapping module executing on the mobile device, the mapping module corresponding to a web services account, and the map tile data configured to display a graphic representation of a geographic location at a computing device, the method comprising:

receiving user mapping activity data from the mobile computing device at a user mapping activity system, the user mapping activity data corresponding to the web services account and indicating a geographic location, the user mapping activity data including one or more of a log of geographic locations corresponding to searches, and routing information for directions between geographic locations represented within maps rendered on the mobile computing device;
extracting geographic location data from the user mapping activity data;
sending the geographic location data to a remote mapping system via a network connection;
matching map tile data to the geographic location data extracted from the user mapping activity data, the map tile data including portions of a map image having a uniform size;
sending the matched map tile data in a vector format from the remote mapping system to the mobile computing device;
storing the matched map tile data in a cache storage of the mobile computing device; and
retrieving the matched map tile data from the cache storage in response to a subsequent request for map tile data from the mobile computing device for display at the mobile computing device without receiving further communication from the remote mapping system.

2. The computer-implemented method of claim 1, wherein the geographic location data includes one or more of a city name, an address, an airport code, or global positioning system coordinates.

3. The computer-implemented method of claim 1, wherein extracting geographic location data from the user mapping activity data includes parsing the user mapping activity data.

4. The computer-implemented method of claim 1, further comprising analyzing the user mapping activity data to determine if the extracted geographic location data is relevant, wherein relevant geographic location data includes a number of geographic location indications above a threshold.

5. The computer-implemented method of claim 4, wherein sending the geographic location data to the remote mapping system includes sending relevant geographic location data to the remote mapping system.

6. The computer-implemented method of claim 5, wherein matching remote mapping system data to the geographic location data extracted from the user mapping activity data includes matching remote mapping system data to the relevant geographic location data extracted from the user mapping activity data.

7. A computer system for pre-fetching map tile data to a mobile computing device based on activity with a mapping module executing on the mobile device, the mapping module corresponding to a web services account, and the map tile data configured to display a graphic representation of a geographic location at a computing device, the system comprising:
a user mapping activity module executable at a mobile computing device, the user mapping activity module including instructions to receive user mapping activity data and to extract geographic location data from the user mapping activity data, wherein the user mapping activity data corresponds to the web services account and includes one or more of a log of locations corresponding to searches and routing information for directions between geographic locations; and
a remote mapping system including instructions to receive the geographic location data from the user mapping activity module, to match remote mapping system data to the geographic location data extracted from the user mapping activity data, and to send the matched remote mapping system data to a computing device for cache storage, wherein the matched remote mapping system data includes portions of a map image having a uniform size.

8. The computer system of claim 7, wherein the geographic location data includes one or more of a city name, an address, an airport code, or global positioning system coordinates.

9. The computer system of claim 8, wherein the user mapping activity module includes further instructions to analyze the user mapping activity data to determine if the extracted geographic location data is relevant, the relevant geographic location data including a number of geographic location indications above a threshold.

10. The computer system of claim 9, wherein the user mapping activity module includes further instructions to send relevant geographic location data to the remote mapping system.

11. The computer system of claim 10, wherein the remote mapping system includes further instructions to match remote mapping system data to the relevant geographic location data extracted from the user mapping activity data.

12. A computer-implemented method for pre-fetching map tile data to a mobile computing device based on activity with a mapping module executing on the mobile device, the mapping module corresponding to a web services account, the map tile data to display a graphic representation of a geographic location, the method comprising:
generating user mapping activity data, the user mapping activity data corresponding to the web services account and indicating a geographic location, the mapping activity data including one or more of a log of geographic locations corresponding to searches performed using a mapping module and routing information for directions between geographic locations;
extracting geographic location data from the user mapping activity;
sending the geographic location data to a remote mapping system via a network connection;
matching map tile data to the geographic location data extracted from the user mapping activity data, the map tile data including portions of a map image having a uniform size;
sending the matched map tile data to the mobile computing device in a vector format;
storing the matched map tile data in a cache storage of the mobile computing device; and
subsequently retrieving the matched map tile data from the cache storage for display at the mobile computing device without receiving further communication from the remote mapping system.

13. The computer-implemented method of claim 12, wherein the geographic location data includes one or more of a city name, an address, an airport code, or global positioning system coordinates.

14. The computer-implemented method of claim 13, further comprising analyzing the extracted user mapping activity data to determine if the extracted geographic location data is relevant, the relevant geographic location data including a number of geographic location indications above a threshold, wherein sending the geographic location data to the remote mapping system includes sending relevant geographic location data to the remote mapping system and matching map tile data to the geographic location data extracted from the user activity data includes matching map tile data to the relevant geographic location data extracted from the user activity data.

15. A tangible computer-readable medium storing instructions for pre-fetching map tile data to a mobile computing device based on user activity with a mapping module executing on the mobile device, the mapping module corresponding to a web services account, the instructions when executed by a processor cause the processor to:

generate user mapping activity data, the user mapping activity data corresponding to the web services account and indicating a geographic location, the mapping activity data including one or more of a log of geographic locations corresponding to searches performed using the mapping module and routing information for directions between geographic locations;

extract geographic location data from the user mapping activity data;

send the geographic location data to a remote mapping system via a network connection;

match map tile data to the geographic location data extracted from the user mapping activity data, the map tile data including portions of a map image having a uniform size;

send the matched map tile data to the mobile computing device in a vector format;

store the matched map tile data in a cache storage of the mobile computing device; and subsequently retrieve the matched map tile data from the cache storage for display at the mobile computing device without receiving further communication from the remote mapping system.

16. The tangible computer-readable medium of claim 15, wherein the geographic location data includes one or more of a city name, an address, an airport code, or global positioning system coordinates.

17. The tangible computer-readable medium of claim 16, further comprising instructions to analyze the user mapping activity data to determine if the extracted geographic location data is relevant, the relevant geographic location data including a number of geographic location indications above a threshold, wherein the instructions to send the geographic location data to the remote mapping system include instructions to send relevant geographic location data to the remote mapping system and the instructions to match map tile data to the geographic location data extracted from the user activity data include instructions to match map tile data to the relevant geographic location data extracted from the user activity data.

* * * * *